United States Patent [19]

Christy

[11] 3,884,954

[45] May 20, 1975

[54] 12-CYANO-5,6,7,12-TETRAHYDRODIBEN-ZO[A,D]CYCLOOCTENES

[75] Inventor: Marcia E. Christy, Perkasie, Pa.

[73] Assignee: Merck & Co., Inc., Rahway, N.J.

[22] Filed: Nov. 7, 1972

[21] Appl. No.: 304,588

Related U.S. Application Data

[62] Division of Ser. No. 701,541, Jan. 30, 1968, abandoned.

[52] U.S. Cl....... 260/465 R; 260/465 E; 260/465 F; 260/465 G; 260/556 AR; 260/562 P; 424/330; 260/570.9
[51] Int. Cl. .......................................... C07c 121/64
[58] Field of Search.................. 260/465 R, 465 G, 260/465 F, 465 E

[56] References Cited
UNITED STATES PATENTS
3,242,212  3/1966  Davis et al. ..................... 260/465 X

*Primary Examiner*—Lewis Gotts
*Assistant Examiner*—Dolph H. Torrence
*Attorney, Agent, or Firm*—Thomas E. Arther; Harry E. Westlake, Jr.; Daniel T. Szura

[57] ABSTRACT

Certain new 5,6,7,12-tetrahydrodibenzo[$a,d$]-cyclooctene-12-methylamines, as well as the N-alkyl and the N,N-dialkyl derivatives thereof, are prepared from the corresponding 5,6,7,12-tetrahydrodibenzo[$a,d$]cyclooctene-12-one by reduction with sodium borohydride to the corresponding 12-ol, conversion by treatment with hydrogen chloride to prepare the corresponding 12-chloro compound, followed by reaction of the 12-chloro compound with silver cyanide to produce the corresponding 12-cyano compound. This 12-cyano compound is reduced with lithium aluminum hydride to produce the corresponding 12-methylamine which is then converted, if desired, to the corresponding N-alkyl, and/or N,N-dialkyl-5,6,7,12-tetrahydrodibenzo[$a,d$]cyclooctene-12-methylamine.
The cyclooctene-12-methylamine, as well as its N-alkyl and N,N-dialkyl derivatives, are active as antiarrhythmic agents.

2 Claims, No Drawings

12-CYANO-5,6,7,12-TETRAHYDRODIBENZO [A,D]CYCLOOCTENES

This is a division of application Ser. No. 701,541 filed Jan. 30, 1968, now abandoned.

This invention relates to derivatives of dibenzocyclooctenes. In particular, it relates to dibenzocyclooctenes which are substituted at the 12-position with an aminomethyl group, and to methods of preparing the same.

The invention also relates to intermediates which are useful in the preparation of the above compounds and to methods for preparing same.

The new compounds of my invention, including the intermediate cyano-substituted and formamido-substituted compounds, as well as the pharmaceutically active amines, are represented structurally as dibenzocyclooctenes of the formula:

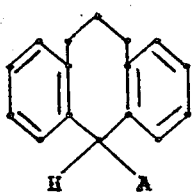

wherein A is a cyano substituent, an alkanoylaminomethyl substituent, an aminomethyl substituent, a monoalkylaminomethyl substituent or a dialkylaminomethyl substituent. Also included are derivatives of the compounds represented structurally hereinabove in which one or more of the hydrogens attached to the 1, 2, 3, 4, 8, 9, 10 or 11 positions is replaced by halogen (fluorine, chlorine, bromine or iodine), alkyl (preferably having from 1–6 carbon atoms) trifluoromethyl, alkoxy (preferably having from 1–5 carbon atoms, alkylsulfonyl (having from 1–5 carbon atoms), alkylmercapto (having from 1–5 carbon atoms), or dialkylsulfamoyl (having from 1–4 carbon atoms).

An especially preferred group of compounds included within the scope of my invention, are represented by the formula:

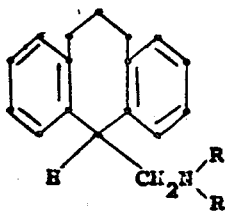

in which R is hydrogen or a loweralkyl substituent, said loweralkyl substituents having preferably from 1–5 carbon atoms.

Also included within the scope of the invention, are the non-toxic pharmaceutically acceptable salts of the above compounds, the preferred salts being the non-toxic acid addition salts such as the hydrochloride, the maleate, and the like, and pharmaceutical compositions of the above compounds, or the salts in combination with a non-toxic pharmaceutically acceptable diluent.

Illustrative of the compounds included within the scope of the invention are 5,6,7,12-tetrahydrodibenzo[a,d]cyclooctene-12-methylamine, the corresponding secondary amines as, for example, the N-methyl, N-ethyl, N-propyl, N-isopropyl, N-butyl, N-t-butyl, N-amyl and the N-hexyl derivatives thereof, as well as the corresponding N,N-dialkyl derivatives thereof.

The compounds represented above, in either their free base or salt form, possess useful pharmacological properties. In particular, they have been found to possess antiarrhythmic activity. It has been found that the administration of compounds of the present invention, depicted in the above formula, results in the prevention of arrhythmia in animals under conditions which ordinarily cause the development of arrhythmia in the animal 100% of the time.

It has further been found that administration of the compounds of the present invention will arrest an existing arrhythmia in the animal being treated and cause a resumption of normal cardiac rhythm. As antiarrhythmic agents, these compounds may be administered orally or parenterally. The formulations for administration may be prepared in conventional manner, employing conventional pharmaceutical carriers and excipients.

The non-toxic acid addition salts useful as components in the compositions provided by the present invention, are salts formed by the reaction of an equivalent amount of the amine compound of the above formula and an acid which is pharmacologically acceptable in the intended doses. Salts of the above compound which are useful are salts of the amine with hydrochloric acid, hydrobromic acid, sulfuric acid, phosphoric acid, fumaric acid, acetic acid, propionic acid, lactic acid, gluconic acid, maleic acid, succinic acid, tartaric acid, and the like. Salts of these acids with the amine base are useful as the active component of the compositions in the method of this invention.

The daily doses are based on the total body weight of the test animal and vary between about 1.0 and 100.0 mg./kg. for mature animals. Thus, a unit dose based on four-times-a-day administration is between 2.5 mg. and 250 mg. for a 10 kg. dog, and a total daily dose for a 10 kg. dog would vary between about 10 mg. and 1,000 mg. For larger animals, up to 100 kg. and above, proportional dosages are employed, based on the weight of the animal. Suitable dosage units provided for the administration of the compositions used in the method of the invention are tablets, capsules (which may be suitably formulated for either immediate or sustained release), syrups, elixirs, parenteral solutions, and the like. These dosage forms preferably contain per unit one or more multiples of the desired dosage unit in combination with the pharmaceutically acceptable diluent or carrier required for preparing the dosage unit.

Although the pharmaceutical compositions of my invention will ordinarily be administered within the ranges indicated, it is necessary for the skilled practitioner to determine the exact dosage, based on variables encountered in treating individual subjects. These variables include the age, sex, general health, and various other factors and, in part, will all affect the determination of the exact amount of active ingredient to be administered, as well as the route of administration.

The compounds represented by the above structural formula may be prepared as illustrated below:

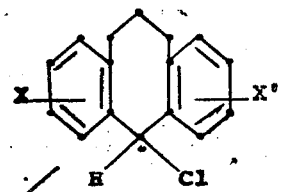

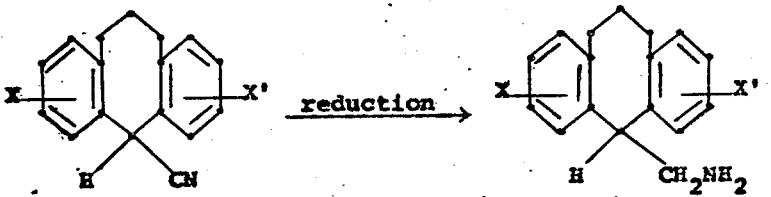

Intermediate        (I)

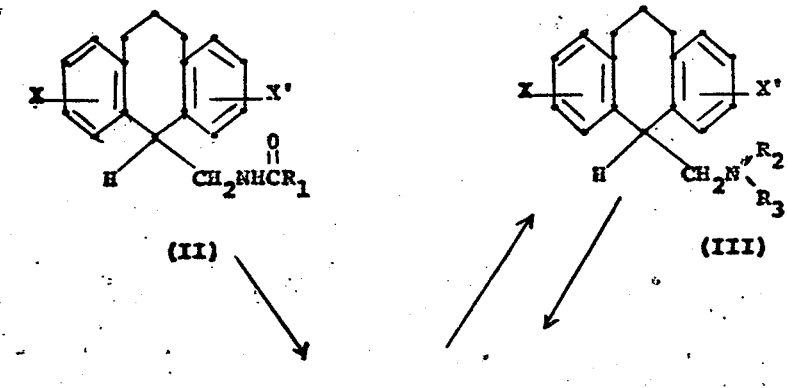

(II)        (III)

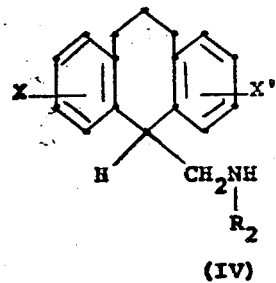

(IV)

wherein X and X' are hydrogen, halogen, alkyl, trifluoromethyl, alkoxy, alkylsulfonyl, alkylmercapto and/or dialkylsulfamoyl; $R_1$ is hydrogen or a 1–4 carbon alkyl; and $R_2$ and $R_3$ are each hydrogen or lower alkyl.

In accordance with the process of my invention, the dibenzocyclooctene-12-methylamine compounds are readily prepared from the corresponding 12-chloro compounds in stepwise fashion by first reacting the appropriately substituted 12-chloro-5,6,7,12-tetrahydrodibenzo[a,d]cyclooctene with a metal cyanide such as cuprous cyanide or silver cyanide in a suitable anhydrous non-hydroxylic solvent such as benzene, toluene, chloroform or acetonitrile to produce the corresponding 12-cyano tetrahydrodibenzo[a,d]cyclooctene. The temperature at which the reaction is carried out is not critical, but it is preferred to employ elevated temperatures in the range of about 50°–100° C. The desired product is readily recovered employing conventional techniques to remove the metal salts which precipitate from the reaction mixture, followed by filtration and evaporation of the solvent and crystallization of the product from solvents.

The thus-obtained 12-cyano-substituted dibenzocyclooctene is then reduced to produce the corresponding 12-methylamine. The reduction is readily effected by contacting the 12-cyano compound with lithium aluminum hydride in the presence of a suitable inert organic solvent such as tetrahydrofuran, ether, or other solvent conventionally employed with lithium aluminum hydride. Preferably, this reduction is carried out in the presence of aluminum chloride and an ether compatible with aluminum chloride as a solvent. The temperature at which the reduction is carried out is not critical, but it is preferred to employ elevated temperatures up to about 50° C. The resulting aminomethyl derivative is readily recovered employing conventional techniques. The 12-formamidomethyl derivative (II) is prepared by formylation of the aminomethyl compound (I) employing conventional conditions and reagents, such as formic acid or esters thereof, for this purpose. The resulting formamidomethyl derivative can be recovered in the conventional manner. The dimethylaminomethyl derivative (III) is readily prepared by the treatment of the primary amine compound (I) with formaldehyde and formic acid in accordance with the known Eschweiler-Clarke modification of the Leuckart Reaction. Recovery of the dimethylaminomethyl derivative is accomplished in conventional manner. The methylaminomethyl compounds (IV) may be prepared by either reduction of the formamidomethyl derivative (II) or by mono-dealkylation of the dimethylaminomethyl derivative (III). Reduction of the formamidomethyl derivative is effected under the first-described conditions set forth above for carrying out the reduction of the 12-cyano derivative. Similarly, dealkylation of (III) can be effected in known manner such as by treatment with cyanogen bromide followed by hydrolysis of the intermediate cyanamide or by treatment with a haloformate followed by hydrolysis of the urethane intermediate. In each instance, the desired compound can be recovered employing conventional techniques.

The N-loweralkylamines and the N,N-diloweralkylamines corresponding to compounds IV and III, respectively, are likewise prepared from the corresponding primary amine I by analogous reactions. Thus, the primary amine I is treated with a lower aliphatic acid halide or anhydride of from 2–5 carbon atoms, e.g., acetyl chloride, acetic anhydride, propionyl chloride, butyryl chloride or valeryl chloride to produce the N-alkanoyl amide corresponding to II as, for example, the N-acetyl, N-propionyl, N-butyryl or N-valeryl amine. The thus-obtained amide is reduced to the corresponding 12-N-loweralkylaminomethyl compound by reduction in the manner described for the corresponding 12-cyano compound, i.e., reduction with lithium aluminum hydride. The secondary amine compounds produced in this manner are the 12-(loweralkyl) derivatives of 5,6,7,12-tetrahydrodibenzo[a,d]cyclooctene-12-methylamine as, for example, the 12-(ethyl), 12-(propyl), 12-(butyl) and the 12-(amyl) derivatives. The corresponding tertiary amines, the N,N-diloweralkyl derivatives, are prepared from the secondary amines by repeating the process employed in the preparation of the secondary amines. Thus, the amides of the secondary amines are prepared and reduced with lithium aluminum hydride to produce the corresponding tertiary amines as, for example, the corresponding 12-(diethyl), 12-(ethylmethyl), 12-(dipropyl), 12-(dibutyl) and the 12-(diamyl) derivatives of substituted and unsubstituted 5,6,7,12-tetrahydrodibenzo[a,d]cyclooctene-12-methylamine.

The starting compounds, namely, the 12-cyano-5,6,7,12-tetrahydrodibenzo[a,d]cyclooctene or a substituted derivative thereof, as defined above, may be prepared from the known 12-keto compound by reduction with sodium borohydride to the corresponding 12-hydroxy-5,6,7,12-tetrahydrodibenzo[a,d]cyclooctene, as described by S. O. Winthrop, M. A. Davis, F. Herr, J. Stewart and R. Gaudry, J. Med. Chem. 6, 130–132 (1963), followed by treatment with hydrogen chloride to produce the corresponding 12-chloro-5,6,7,12-tetrahydrodibenzo[a,d]cyclooctene. The thus-obtained 12-chloro compound is then treated with silver cyanide in a suitable anhydrous non-hydroxylic solvent and at a suitable temperature, preferably in the range of 50°–150° C.

The following examples are illustrative but not limitative of the invention.

EXAMPLE 1

12-Cyano-5,6,7,12-tetrahydrodibenzo[a,d]cyclooctene 5,6,7,12-Tetrahydrodibenzo[a,d]cycloocten-12-ol, 5.95 g. (0.0266 mole), is dissolved in 210 ml. of dry benzene and the ice-cold solution saturated with hydrogen chloride. The mixture is allowed to stand for 3½ hours, with additional passage of hydrogen chloride through the solution for 5 minutes at the end of the first hour. The excess hydrogen chloride and the bulk of the solvent are evaporated under reduced pressure at 30°–35° C., leaving 12-chloro-5,6,7,12-tetrahydrodibenzo[a,d]cyclooctene as the residual oil.

The crude chloride is dissolved in 150 ml. of dry acetonitrile and stirred at reflux with 5.35 g. (0.04 mole) of silver cyanide. After about 18 hours, 50 ml. of dry benzene is added and refluxing is continued for another 24 hours. Silver salts are removed by filtration and washed with boiling benzene. Evaporation of the solvents under reduced pressure and crystallization of the residue from cyclohexane yields product, m.p. 188°–192° C. A purified sample melts at 193°–194° C. after repeated crystallizations from cyclohexane.

Anal. Calcd. for $C_{17}H_{15}N$: C, 87.50; H, 6.48.

Found: C, 86.81; H, 5.68.

EXAMPLE 2

5,6,7,12-Tetrahydrodibenzo[a,d]cyclooctene-12-methylamine

Lithium aluminum hydride, 0.304 g. (0.008 mole) is weighed under nitrogen, transferred to a dry, nitrogen-flushed reaction flask, and suspended in 10 ml. of absolute ether. A solution of 1.05 g. (0.008 mole) of aluminum chloride in 20 ml. of absolute ether is added dropwise and the mixture is stirred for 5 minutes at room temperature. A solution of 0.90 g. (0.00386 mole) of 12-cyano-5,6,7,12-tetrahydrodibenzo[a,d]cyclooctene in 100 ml. of absolute ether then is added dropwise and the mixture is stirred at room temperature for about 17 hours under a slow stream of nitrogen. The adduct is hydrolyzed by the dropwise addition of 8 ml. of water. The ethereal solution is decanted and the gelatinous precipitate washed with ether. The precipitate is shaken with 20 ml. of 10 N aqueous sodium hydroxide and 50 ml. of water, and the mixture extracted with three portions of benzene. Evaporation of the combined extracts under reduced pressure leaves the product as the oily base.

The base is converted to the hydrogen oxalate salt by treating an ethanolic solution of the base with a slight excess of oxalic acid in ethanol. The hydrogen oxalate separates in white crystals, m. p. 216°–218° C. dec. An analytical sample melts at 219°–220° C. dec., after repeated crystallizations from methanol.

Anal. Calcd. for $C_{17}H_{19}N \cdot C_2H_2O_4$: C, 69.70; H, 6.47; N, 4.28.

Found: C, 69.36; H, 6.25; N, 4.25.

EXAMPLE 3

N-(5,6,7,12-Tetrahydrodibenzo[a,d]cyclooctene-12-methyl)-formamide 5,6,7,12-Tetrahydrodibenzo[a,d]cyclooctene-12-methylamine, 0.245 g. (0.001 mole), is heated to refluxing in 15 ml. of ethyl formate for 5½ hours. Evaporation of the solution under reduced pressure leaves the product as the crystalline residue, m. p. 195°–196° C. A purified sample melts at 196°–197.5° C. after recrystallization from benzene - hexane.

Anal. Calcd. for $C_{18}H_{19}NO$: C, 81.47; H, 7.22; N, 5.28.

Found: C, 81.32; H, 6.97; N, 5.24.

EXAMPLE 4

N-Methyl-5,6,7,12-tetrahydrodibenzo[a,d]cyclooctene-12-methylamine

Lithium aluminum hydride, 0.33 g. (0.0087 mole) is weighed under nitrogen, transferred to a dry, nitrogen-flushed reaction flask, and suspended in 20 ml. of absolute ether. A solution of 1.1 g. (0.00415 mole) of N-(5,6,7,12-tetrahydrodibenzo[a,d]cyclooctene-12-methyl)-formamide in 950 ml. of absolute ether is added rapidly dropwise and the mixture is stirred at reflux for about 18 hours. After cooling in an ice-bath, the complex is hydrolyzed by the successive dropwise addition of 0.5 ml. of water, 0.5 ml. of 15% aqueous sodium hydroxide, and 1.0 ml. of water. The precipitate is removed by filtration and the ethereal filtrate evaporated under reduced pressure, leaving the product as the residual oily base.

The hydrochloride is prepared from the base by treating an ethanolic solution with a slight excess of ethanolic hydrogen chloride. Dilution with absolute ether precipitates the crystalline salt. A purified sample melts at 269°C. dec., after recrystallizations from ethanol - ether.

Anal. Calcd. for $C_{18}H_{21}N \cdot HCl$: C, 75.11; H, 7.71; Found: C, 74.86; H, 7.83.

EXAMPLE 5

N,N-Dimethyl-5,6,7,12-tetrahydrodibenzo[a,d]cyclooctene-12-methylamine 5,6,7,12-Tetrahydrodibenzo[a,d]cyclooctene-12-methylamine, 1.2 g (0.005 mole), and 0.9 g. (0.011 mole) of 36–38% aqueous formaldehyde in 3 ml. of 88% formic acid are heated on the steam-bath for about 18 hours. After the addition of 2 ml. of concentrated hydrochloric acid, the mixture is evaporated to dryness under reduced pressure. The residual syrup is dissolved in 25 ml. of water, the ice-cold solution made strongly basic with 40% aqueous sodium hydroxide, and the mixture extracted with several portions of benzene. Evaporation of the combined, washed, and dried extracts under reduced pressure leaves the product as the oily base.

Using the appropriate starting materials, the following products are also prepared as set forth in the preceding description.

| Example | Flow Sheet Formula | X | X' |
|---|---|---|---|
| 6 | Intermediate | H | Chloro |
| 7 | do. | H | Bromo |
| 8 | do. | H | Methyl |
| 9 | do. | H | Tert-butyl |
| 10 | do. | H | Methoxy |
| 11 | do. | H | Ethoxy |
| 12 | do. | H | Trifluoromethyl |
| 13 | do. | H | Methylsulfonyl |
| 14 | do. | H | Methylmercapto |
| 15 | do. | H | Dimethylsulfamoyl |
| 16 | do. | Bromo | Chloro |
| 17 | do. | Bromo | Dimethylsulfamoyl |
| 18 | do. | Methyl | Methyl |
| 19 | Intermediate | Chloro | Methyl |
| 20 | do. | Chloro | Dimethylsulfamoyl |
| 21 | do. | Chloro | Chloro |
| 22 | I | H | Chloro |
| 23 | do. | H | Bromo |
| 24 | do. | H | Methyl |
| 25 | do. | H | Tert-butyl |
| 26 | do. | H | Methoxy |
| 27 | do. | H | Ethoxy |
| 28 | do. | H | Trifluoromethyl |
| 29 | do. | H | Methylsulfonyl |
| 30 | do. | H | Methylmercapto |
| 31 | do. | H | Dimethylsulfamoyl |
| 32 | do. | Bromo | Chloro |
| 33 | do. | Bromo | Dimethylsulfamoyl |
| 34 | do. | Methyl | Methyl |
| 35 | do. | Chloro | Methyl |
| 36 | do. | Chloro | Dimethylsulfamoyl |
| 37 | do. | Chloro | Chloro |
| 38 | III | Derivatives of each of compounds of Formula I above in which $R_2$ and $R_3$ are each methyl, ethyl, propyl, butyl or amyl. | |
| 39 | IV | Derivatives of each of the compounds of Formula I above in which $R_2$ is methyl, ethyl, propyl, butyl or amyl. | |

EXAMPLE 40

Prevention or Modification of Ventricular Arrhythmia

Beagle dogs of either sex, and weighing from 6 to 10 kg. are anesthetized by the administration of vinbarbital employing a dose of 50 mg./kg. of body weight, and the mean arterial pressure and the electrocardiogram (Lead II) are recorded. The animals are artificially respired and the thorax opened at the fourth or fifth interspace. The pericardium is opened and a portion of the anterior descending coronary artery just distal to the origin is freed from the surrounding tissue. Mecamylamine is administered to slow the heart rate and 10 minutes later the compound to be tested for antiarrhythmic effect is administered intravenously. Ten minutes after administration of the test compound 0.0035 ml./kg. of tetrafluorohexachlorobutane (TFHCB), a sclerosing agent which produces myocardial infarction and arrhythmia in dogs (Ascanio et al., J. Am. Physiol. 209: 1081–1088 (1965)), is injected into the coronary artery. Following injection of the sclerosing agent, the electrocardiogram is recorded at 2-minute intervals for 1 hour, and the average number of electrical (ECG) complexes per minute and the percent normal complexes calculated.

In control animals, the dose of sclerosing agent used produces a ventricular arrhythmia in 100% of the animals tested, and death in 33% as a result of ventricular fibrillation. In control animals, on the average, fewer than 20% of all recorded ECG complexes are normal.

The test compound, 5,6,7,12-tetrahydrodibenzo[a,d]cyclooctene-12-methylamine, was demonstrated to have antiarrhythmic activity and in these experiments at 5.0 mg./kg. on the average 70% of all ECG complexes were normal and none of the animals succumbed to ventricular fibrillation.

EXAMPLE 41

Tablets:

Tablets for oral administration are prepared by mixing the active ingredient with appropriate amounts of excipients and binding agents, formed into tablets by a conventional tableting machine and coated so that each tablet will have the following composition.

|  | Per Tablet |  |
| --- | --- | --- |
| N-methyl-5,6,7,12-tetrahydro-dibenzo[a,d]cyclooctene-12-methylamine hydrochloride | 10 | mg. |
| Cellulose filter aid | 11 | mg. |
| Lactose | 9 | mg. |
| Calcium Phosphate Dibasic | 143 | mg. |
| Guar Gum | 6.1 | mg. |
| Corn Starch | 4 | mg. |
| Magnesium Stearate | 0.9 | mg. |
| Opaque yellow film coating | 3 | mg. |

EXAMPLE 42

Capsules:

Capsules for oral administration are prepared by dispersing the active ingredient in lactose and magnesium stearate and encapsulating the mixture in standard soft gelatin capsules so that each capsule will have the following composition.

|  | Per Capsule |
| --- | --- |
| N-methyl-5,6,7,12-tetrahydro-dibenzo[a,d]cyclooctene-12-methylamine hydrochloride | 5 mg. |
| Lactose | 430 mg. |
| Magnesium Stearate | 5 mg. |

EXAMPLE 43

Parenteral Solution:

A solution suitable for administration for injection is prepared by mixing the active ingredients, Dextrose, methylparaben, propylparaben and distilled water, so that each one will have the following composition, and sterilized.

|  | Per ml. |  |
| --- | --- | --- |
| N-methyl-5,6,7,12-tetrahydro-dibenzo[a,d]cyclooctene-12-methylamine hydrochloride | 5 | mg. |
| Dextrose | 44 | mg. |
| Methylparaben | 1.5 | mg. |
| Propylparaben | 0.2 | mg. |
| Water for Injection | q.s. |  |

The preceding three examples, Examples 41, 42 and 43, are repeated, and compositions for the treatment or prevention of arrhythmia are prepared by substituting any of the compounds specifically illustrated above in place of the 5,6,7,12-tetrahydrodibenzo[a,d]cyclooctene as one of the active compounds useful in my invention.

I claim:

1. A compound of the structural formula

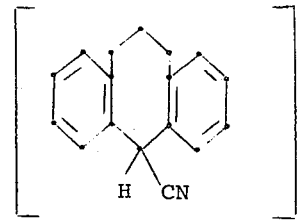

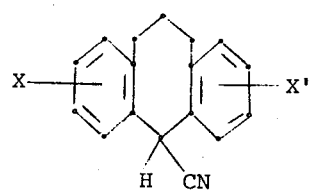

wherein X and X' are selected from the group consisting of hydrogen, halogen, alkyl having from 1–6 carbon atoms, trifluoromethyl, $C_1$–$C_5$-alkylsulfonyl, $C_1$–$C_5$-alkylmercapto, $C_1$–$C_5$-alkoxy or di-$C_1$–$C_4$-alkylsulfamoyl.

2. The compound 12-cyano-5,6,7,12-tetrahydrodibenzo[a,d]cyclooctene.

* * * * *